(12) United States Patent
Higuchi

(10) Patent No.: US 10,368,020 B2
(45) Date of Patent: Jul. 30, 2019

(54) IMAGE CAPTURING APPARATUS AND CONTROL METHOD THEREFOR

(71) Applicant: CANON KABUSHIKI KAISHA, Tokyo (JP)

(72) Inventor: Daisuke Higuchi, Nagareyama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/837,539

(22) Filed: Dec. 11, 2017

(65) Prior Publication Data

US 2018/0184029 A1 Jun. 28, 2018

(30) Foreign Application Priority Data

Dec. 22, 2016 (JP) ................. 2016-249804

(51) Int. Cl.
| | |
|---|---|
| *H04N 5/367* | (2011.01) |
| *H04N 5/369* | (2011.01) |
| *H04N 5/232* | (2006.01) |
| *H04N 5/341* | (2011.01) |
| *H04N 5/3745* | (2011.01) |

(52) U.S. Cl.
CPC ....... *H04N 5/3675* (2013.01); *H04N 5/23212* (2013.01); *H04N 5/232122* (2018.08); *H04N 5/341* (2013.01); *H04N 5/3696* (2013.01); *H04N 5/36961* (2018.08); *H04N 5/37457* (2013.01)

(58) Field of Classification Search
CPC .......... H04N 5/3675; H04N 5/232122; H04N 5/36961; H04N 5/3696; H04N 5/23212; H04N 5/341; H04N 5/37457
See application file for complete search history.

(56) References Cited

U.S. PATENT DOCUMENTS

| | | | | |
|---|---|---|---|---|
| 2012/0154637 A1* | 6/2012 | Hara | ................. | H04N 5/23212 348/239 |
| 2012/0176520 A1* | 7/2012 | Hara | ................. | H04N 5/23212 348/246 |
| 2013/0265295 A1* | 10/2013 | Ogawa | ................. | G09G 5/003 345/214 |
| 2015/0062374 A1* | 3/2015 | Okazawa | ................. | G02B 7/34 348/229.1 |
| 2015/0373287 A1* | 12/2015 | Uchida | ................. | H04N 5/345 348/298 |

(Continued)

FOREIGN PATENT DOCUMENTS

JP 2016-21052 A 2/2016

*Primary Examiner* — Nhan T Tran
(74) *Attorney, Agent, or Firm* — Canon U.S.A., Inc. IP Divison

(57) ABSTRACT

In an apparatus, a control unit switches acquisition of a phase difference signal for each area in a sensing device, a correction unit selects defect information associated with a pixel signal acquired from the sensing device and corrects the pixel signal based on the selected defect information, and a memory stores the defect information. The defect information stored in the memory includes at least first defect information and second defect information in the same format as that of the first defect information. The correction unit switches defect information to be used based a change in an area in a frame for which the phase difference signal is to be acquired.

12 Claims, 13 Drawing Sheets

(56) References Cited

U.S. PATENT DOCUMENTS

2016/0323508 A1* 11/2016 Ayalasomayajula ........................ H04N 5/23245
2017/0064226 A1* 3/2017 Ishii ....................... H04N 5/361

* cited by examiner

| TYPE | THRESHOLD VALUE |
|------|-----------------|
| K1   | TH1             |
| K2   | TH2             |

| ADDRESS | LEVEL | TYPE |
|---------|-------|------|
| X1,Y1 | L1 | K2 |
| X2,Y2 | L2 | K2 |
| X3,Y3 | L3 | K1 |
| X4,Y4 | L4 | K2 |
| X5,Y5 | L5 | K2 |
| X6,Y6 | L6 | K2 |
| X7,Y7 | L7 | K1 |
| X8,Y8 | L8 | K1 |
| X9,Y9 | L9 | K2 |
| X10,Y10 | L10 | K1 |

FIG. 15

| ADDRESS | LEVEL | TYPE |
|---|---|---|
| X1,Y1 | L1 | K2 |
| X2,Y2 | L2 x α | K2 |
| X3,Y3 | L3 | K1 |
| X4,Y4 | L4 x α | K2 |
| X5,Y5 | L5 | K2 |
| X6,Y6 | L6 x α | K2 |
| X7,Y7 | L7 | K1 |
| X8,Y8 | L8 | K1 |
| X9,Y9 | L9 | K2 |
| X10,Y10 | L10 | K1 |

FIG. 16

| ADDRESS | LEVEL | TYPE |
|---|---|---|
| X1,Y1 | L1 x α | K2 |
| X2,Y2 | L2 x α | K2 |
| X3,Y3 | L3 | K1 |
| X4,Y4 | L4 | K2 |
| X5,Y5 | L5 | K2 |
| X6,Y6 | L6 | K2 |
| X7,Y7 | L7 | K1 |
| X8,Y8 | L8 | K1 |
| X9,Y9 | L9 x α | K2 |
| X10,Y10 | L10 | K1 |

FIG. 19

|  | ADDRESS | LEVEL | TYPE |
|---|---|---|---|
| D1_1 | X1,Y1 | Linit | K2 |
| D1_2 | X2,Y2 | Linit | K2 |
| D1_3 | X3,Y3 | L3 | K1 |
| D1_4 | X4,Y4 | Linit | K2 |
| D1_5 | X5,Y5 | Linit | K2 |
| D1_6 | X6,Y6 | Linit | K2 |
| D1_7 | X7,Y7 | L7 | K1 |
| D1_8 | X8,Y8 | L8 | K1 |
| D1_9 | X9,Y9 | Linit | K2 |
| D1_10 | X10,Y10 | L10 | K1 |

FIG. 20

|  | ADDRESS | LEVEL | TYPE |
|---|---|---|---|
| D2_1 | X1,Y1 | Linit | K2 |
| D2_2 | X2,Y2 | Linit | K2 |
| D2_3 | X3,Y3 | L3 | K1 |
| D2_4 | X4,Y4 | Linit | K2 |
| D2_5 | X5,Y5 | Linit | K2 |
| D2_6 | X6,Y6 | Linit | K2 |
| D2_7 | X7,Y7 | L7 | K1 |
| D2_8 | X8,Y8 | L8 | K1 |
| D2_9 | X9,Y9 | Linit | K2 |
| D2_10 | X10,Y10 | L10 | K1 |

| VERTICAL ADDRESS | FIRST LEVEL | SECOND LEVEL | FIRST RAM ADDRESS | SECOND RAM ADDRESS |
|---|---|---|---|---|
| Y1 | L1 | L1 x α | D1_1 | D2_1 |
| Y2 | L2 | L2 x α | D1_2 | D2_2 |
| Y4 | L4 | L4 x α | D1_4 | D2_4 |
| Y5 | L5 | L5 x α | D1_5 | D2_5 |
| Y6 | L6 | L6 x α | D1_6 | D2_6 |
| Y9 | L9 | L9 x α | D1_9 | D2_9 |

IMAGE CAPTURING APPARATUS AND CONTROL METHOD THEREFOR

BACKGROUND OF THE INVENTION

Field of the Invention

The aspect of the embodiments relates to an image capturing apparatus and a control method therefor, and more particularly, to a technique of correcting a defective pixel of an image sensing device in the image capturing apparatus.

Description of the Related Art

In an image sensing device used in an image capturing apparatus such as a digital camera or the like, signal charges of a plurality of pixels arranged in a pixel array each include not only a signal charge which is obtained as a result of a photoelectric conversion of incident light and thus which corresponds to the incident light, but also a signal charge due to a cark current. Among the pixels, there may be a pixel in which a large amount of signal charge due to a dark current occurs compared with other surrounding pixels. Hereinafter, such a pixel will be referred to as a "defective pixel". If a signal output from a defective pixel is directly used in forming an image, degradation in image quality may occur. When object information is detected from an image, direct use of a defective pixel may result in degradation in detection accuracy. To handle the above situation, for example, information about a defective pixel, such as an address of the defective pixel in an image sensing device, may be stored in a non-volatile memory before being shipped from a factory (hereinafter, such information will be referred to as defect information), and in an actual image capturing operation, the defective pixel may be corrected based on the defect information.

It is known to configure an image capturing apparatus such that in an image sensing device, a photoelectric conversion area of each pixel is divided into a plurality of areas, and a phase difference of a signal obtained for each of the plurality of photoelectric conversion areas is detected thereby achieving improved accuracy in automatic focusing. Use of this technique may provide an advantage that phase difference information for the whole area can be acquired based on a signal acquired from the image sensing device. However, this technique has a disadvantage that reading is performed a plurality of times for each pixel, and this may cause a reduction in the number of frames readable per unit time (the frame rate). To handle the above situation, Japanese Patent Laid-Open No. 2016-21052 discloses a technique in which reading from each pixel is performed a plurality of times only for an area in which a phase difference is detected, and reading from each pixel is performed only once for the other area thereby achieving an increase in frame rate.

SUMMARY OF THE INVENTION

In an aspect, the disclosure provides an apparatus including sensing device capable of acquiring a phase difference signal for use in focus detection and a pixel signal for an image, the image capturing apparatus including a control unit configured to switch acquisition of the phase difference signal on an area-by-area basis in a frame in the sensing device, a correction unit configured to select defect information associated with the pixel signal acquired from the sensing device and correct the pixel signal based on the selected defect information, and a memory configured to store the defect information, wherein the defect information includes at least first defect information and second defect information in the same format as that of the first defect information, and the correction unit switches defect information used, based on a change of an area in a frame in which the phase difference signal is to be acquired.

Further features of the disclosure will become apparent from the following description of exemplary embodiments with reference to the attached drawings.

BRIEF DESCRIPTION OF THE DRAWINGS

FIG. 15 is a diagram illustrating an example of second defect information.

FIG. 16 is a diagram illustrating an example of third defect information.

FIG. 19 is a diagram illustrating an example of fifth defect information.

FIG. 20 is a diagram illustrating an example of sixth defect information.

DESCRIPTION OF THE EMBODIMENTS

Embodiments of the disclosure are described in detail below with reference to drawings. Note that sizes, materials, shapes, relative locations, and the like of the constituent elements and other parameters described by way of example in the embodiments may be modified depending on a configuration of the apparatus or various conditions, and the parameters are not limited to those examples. First, a total configuration of an image capturing apparatus, which is common among embodiments, is described with reference to FIG. 1. In the embodiments described below, a digital video camera adapted to acquire a moving image is explained as an example of the image capturing apparatus. However, the embodiments may be applied to other types of image capturing apparatuses such as a digital camera adapted to acquire also a still image, a monitor camera, a portable telephone, an in-vehicle (mobile) camera, and the like.

Figure 1:
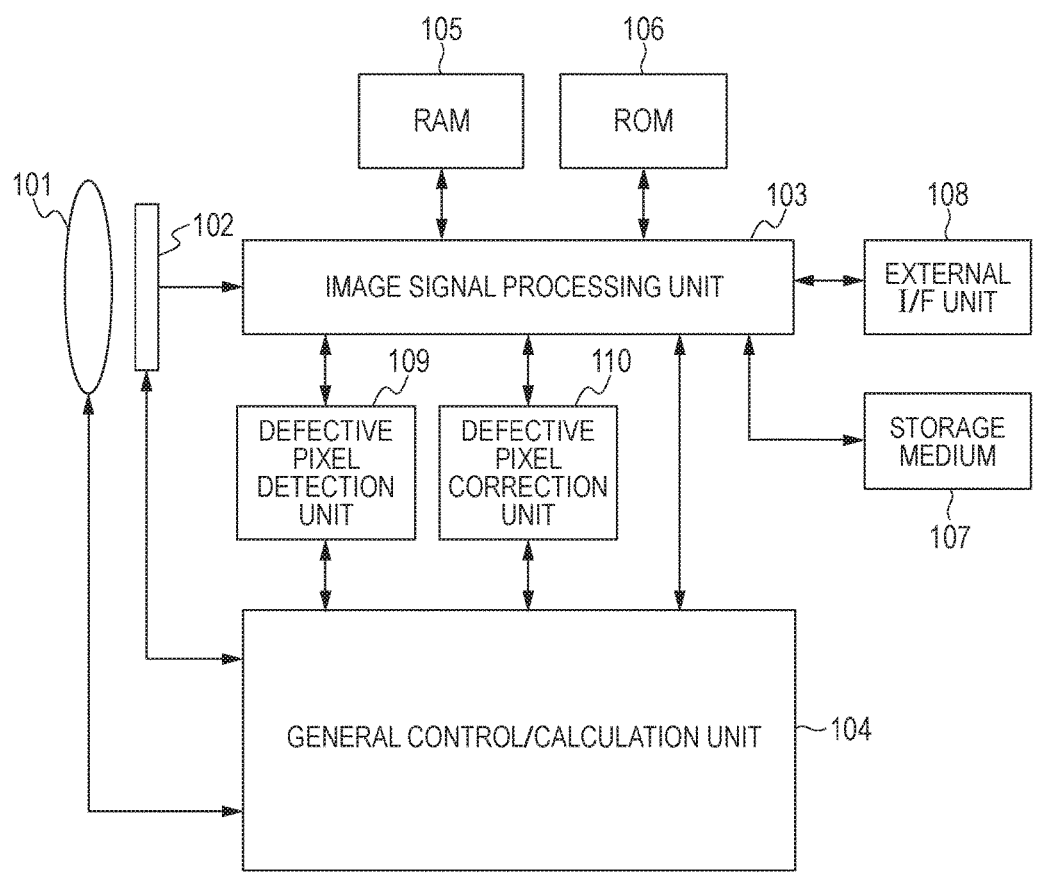
FIG. 1 is a block diagram of an image capturing apparatus according to an embodiment of the disclosure.

The configuration of the image capturing apparatus is described below for various blocks thereof with reference to FIG. 1.

101 denotes a lens (an imaging optical system) for forming an optical image of an object, including a magnification lens (a zoom lens) configured to move in a direction along an optical axis in a zooming operation, a focus lens configured to move in the direction along the optical axis in a focus adjustment process. The lens 101 also includes an aperture and an ND filter adapted to control an amount of incident light.

102 denotes an image sensing device configured to photoelectrically convert the optical image formed through the lens 101 to an electric signal. The image sensing device 102 may be a CMOS-type image sensor configured to make an exposure using a rolling shutter method or a global shutter method. An optical image obtained as a result of exposure is output as a pixel signal from each pixel to the outside. A further detailed description of the image sensing device 102 and an operation thereof will be given later.

103 denotes an image signal processing unit including a correction unit configured to perform, on a frame-by-frame basis, a correction process on the pixel signal output from the image sensing device 102 and a generation unit configured to generate an image signal in a particular format based on the pixel signal in units of frames corrected by the correction unit, and other units. The image processing unit performs an image processing and an analysis process on the image signal and outputs a result to each block. The image signal processing unit 103 also includes an aberration correction processing unit configured to correct an optical aberration of the lens 101 and a noise reduction processing unit configured to perform a noise reduction process on the pixel signal output from the image sensing device 102 to reduce fixed pattern noise or random noise. The image signal processing unit 103 may also include a digital signal processing unit configured to perform compressing and coding on the image signal after various corrections are performed on the pixel signal. The image signal processing unit 103 may also include an analysis processing unit configured to perform an analysis process on each signal. The analysis process may include an object detection process to detect whether a particular object (a face or the like) is included or not in the image, a motion detection process to detect a motion of the object, a luminance detection process to detect luminance of the object, and/or the like.

104 denotes a general control/calculation unit for controlling the whole image capturing apparatus. The general control/calculation unit 104 includes a CPU that performs various calculations and controls the whole image capturing apparatus. To controls the whole image capturing apparatus, the CPU generally controls various constituent elements and performs setting of various setting parameters. The CPU includes a cache memory or the like capable of electrically writing and erasing data, and executes a program stored in the cache memory. Note that the memory is used as an area in which a program to be executed by the system control CPU is stored, a work area used during the execution of the program, a data storage area, or the like. The general control/calculation unit 104 calculates setting values for the image sensing device 102, the lens 101, a flash (not shown), and the like in terms of exposure conditions based on a result of analysis on various signals output from the image signal processing unit 103. More specifically, the setting of exposure parameters is performed using a program chart produced and stored based on the luminance of an object included in a result of analysis performed by the image signal processing unit 103 such that an exposure time to be set to the image sensing device 102, an F-value for the lens 101, an amount of light emitted by the flash (not shown) are determined. In the above description, it is assumed that the calculation is performed by the image signal processing unit 103. Alternatively, part or all of the calculation may be performed by the general control/calculation unit 104. Note that the exposure time refers to timing of operating an electronic shutter and is controlled by the general control/calculation unit 104 by sending, to the image sensing device 102, a timing signal to control starting of charge accumulation and a timing signal to control reading of the charge. The general control/calculation unit 104 changes a reading method (a drive mode) of the image sensing device 102 depending on menu setting, AF frame setting, or the like given via an operation unit (not shown).

105 denotes a RAM configured to temporarily store a result of a calculation performed by the general control/calculation unit 104 and/or a signal output from the image signal processing unit 103. The RAM 105 may be provided separately from the cache memory included in the CPU, or the RAM 105 and the cache memory may be realized using the same memory.

106 denotes a ROM configured to store defect information and/or various adjustment values. The various kinds of data stored in the ROM 106 may be loaded into the RAM 105, under the control of the general control/calculation unit 104, at a proper time such as when the apparatus is started.

107 denotes a storage medium such as a DVD, a hard disk, a non-volatile memory, etc. 108 denotes an external I/F unit via which to output a captured image to an external monitor or a recorder, or input an image from another image capturing apparatus or an external device such as a player. The image capturing apparatus may be connected to a computer via the external I/F unit 108 to acquire information via the computer and the Internet. The external I/F unit 108 may be realized using a wired communication system such as USB, Ethernet®, etc., or a wireless communication system such as a wireless LAN system, etc.

109 denotes a defective pixel detection unit configured to detect whether a defect is included in a pixel signal output from the image sensing device 102 or an image signal stored in the RAM 105. Based on a result of the detection for each pixel, defective pixel data is generated. Furthermore, defect information is generated based on the defective pixel data and stored in the RAM 105, the ROM 106, or the like. Note that the defective pixel data includes information indicating a defect level, a defective pixel address, a defect type, etc. The defect level is mainly determined by an output difference between a pixel of interest and surrounding pixels. In a case where the output of the pixel of interest is higher than the outputs of surrounding pixels, the pixel of the interest is said to have a while defect, while in a case where the output is lower, the pixel of interest is said to have a black defect. The defective pixel address indicates a location in the pixel array of the image sensing device 102. The address may be represented by a combination of a horizontal coordinate and a vertical coordinate so as to indicate an absolute location. Alternatively, the address may represent a relative location (distance) between defective pixels as measured in a signal scanning direction. The defect type is determined by a cause of the defect. The defect level of each defective pixel depends on conditions (an image capturing condition, a circumstance condition, etc.) which may vary depending on the cause of the defect. Therefore, before being shipped from a factory, an image signal is acquired under a plurality of image capturing conditions, and a defect type for each condition is determined based on the acquired image signal and the determined defect type is stored. In the defect detection process for a plurality of image capturing conditions, there is a possibility that a plurality of defects are detected for the same pixel (at the same address). In this case, types of a plurality of defects and defect levels in association with the address of the one defective pixel are stored. Furthermore, in a correction process described later, the defective pixel data which is defection information detected by the defective pixel detection unit 109 may be modified. As for the defect level, for example, a plurality of ranges of the level may be defined, and the defect level may be represented by a range in which the defect level falls and the range may be stored as the defect level. Hereinafter, the defective pixel data modified in the above-described manner will be referred to as modified defect data. Information included in the defective pixel data may be similar to that included in the modified defect data. Note that other information may be added, or unnecessary information may be removed when the data is modified. Note that the defect information stored in the RAM 105 or the like is a set of modified defect data.

110 denotes a defective pixel correction unit configured to correct a defective pixel using defect information generated based on defective pixel data detected by the defective pixel detection unit 109. More specifically, modified defect data is selected from defect information stored in the RAM 105, the ROM 106, or the like, for use by the defective pixel correction unit 110 in the defect correction process, and the correction is performed using the selected modified defect data. The selection is performed by the general control/calculation unit 104 based on the image capturing condition (ISO sensitivity, exposure time), the ambient temperature or the temperature of the image sensing device 102 acquired from a temperature detector (not shown), the drive mode of the image sensing device 102, etc.

Figure 2:
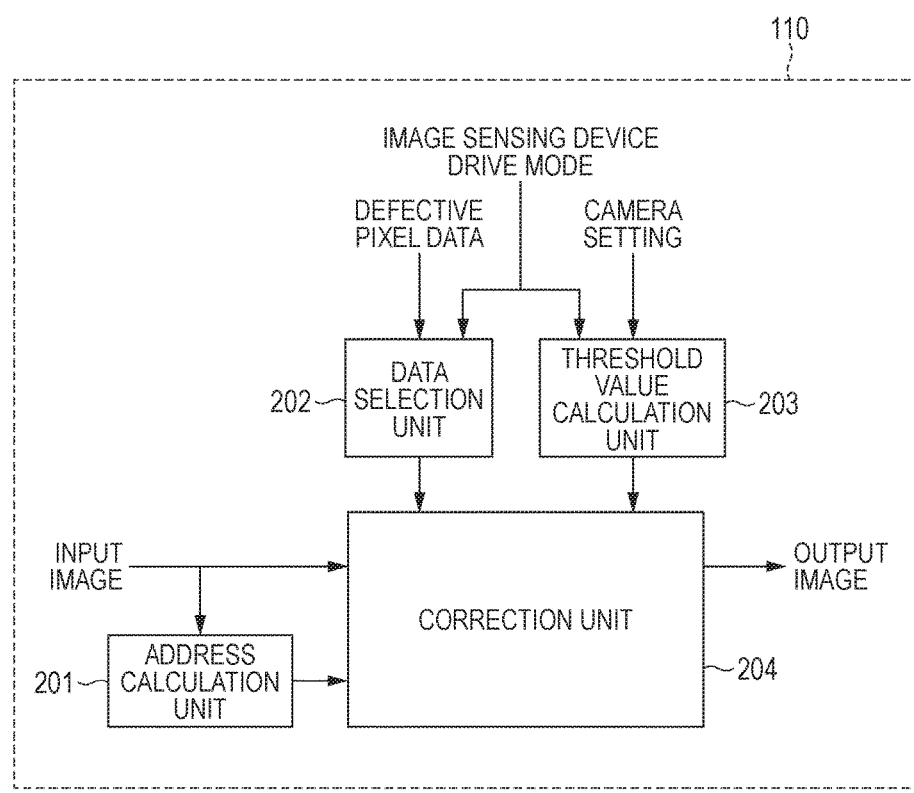
FIG. 2 is a diagram illustrating an internal configuration of a defective pixel correction unit.

FIG. 2 is a diagram illustrating an internal configuration of the defective pixel correction unit 110.

201 denotes an address calculation unit configured to count the number of pixel signals input in the scanning order of the image sensing device 102, and generate address information corresponding to a pixel signal of a pixel of interest to be corrected.

202 denotes a data selection unit configured to read defect information from the RAM 105, selects a part of the defect information under the control of the general control/calculation unit 104, and transfers the selected part of the defect information as modified defect data to a correction unit 204 described below.

203 denotes a threshold value calculation unit configured to calculate a proper threshold value depending on camera setting based on a predetermined threshold value, and transfer the calculated threshold value to the correction unit 204 described below.

The correction unit 204 compares the defect level included in the modified defect data for an image signal with the threshold value. When the comparison indicates that the defect level of the pixel signal is larger than the threshold value, the correction unit 204 corrects the pixel signal using surrounding pixels. More specifically, a judgement is performed as described below. First, when an image signal of a pixel of interest is input to the correction unit 204, defect information associated with the pixel of interest is selected by the data selection unit 202 and transferred to the correction unit 204. The address of the pixel of interest is also input from the address calculation unit 201 to the correction unit 204. Based on the address input from the address calculation unit 201, the correction unit 204 extracts target information (modified defect data) included in the defect information. The target information includes the defect level and the defect type. Furthermore, the threshold value calculated by the threshold value calculation unit 203 based on the camera setting is input to the correction unit 204. The correction unit 204 compares the defect level included in the target information with the input threshold value. If the result of the comparison indicates that the defect level is large than the threshold value, it is determined that the defect level of the pixel of interest it to be corrected, and the correction unit 204 corrects the pixel of interest using surrounding pixels. In the present embodiment, the defect level included in the modified defect data is compared with the threshold value, but alternatively, instead of the defect level, a value of the input pixel signal may be compared with a threshold value or the judgement may be performed based on a combination of results of both. However, in the case where the input pixel value is compared with the threshold value, the comparison process may cause an increase in processing time, which may be an issue in a case where a short processing time is desirable. Therefore, in one embodiment, the process is changed depending on a frame rate or the like.

Figures 3, 4:
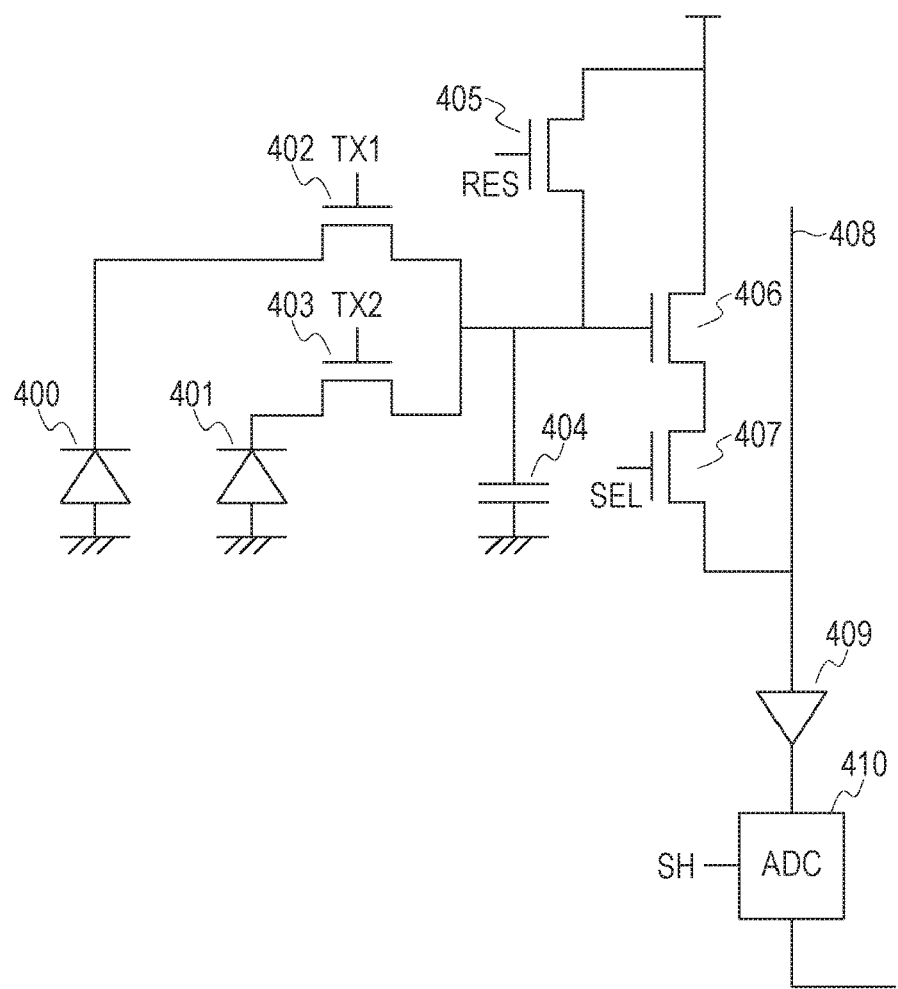
FIG. 3 is a diagram schematically illustrating a pixel configuration of an image sensing device.
FIG. 4 is a diagram illustrating a circuit configuration of one pixel in an image sensing device.

FIG. 3 is a diagram schematically illustrating a pixel configuration of the image sensing device 102. Rectangles represented by solid lines indicate pixel areas. Each pixel has a color filter of one of following colors: R; G; and B. The color filters are arranged in the form of a Bayer arrangement. Each pixel is divided, at a boundary represented by a broken line, into left-hand and right-hand areas (an area a and an area b). Each divided area is a photoelectric conversion element that is configured to perform a photoelectric conversion and that is capable of holing a charge independently of other areas and outputting a pixel signal independently. Each pixel is provided with one microlens (not shown) such that an optical image of an object formed through the lens 101 is divided and a resultant divided optical image is acquired. In other words, the area of an exit pupil of the lens 101 is divided. By detecting a phase difference between image signals acquired from the respective areas, it is possible to calculate a distance to the object. This calculation is performed by the general control/calculation unit 104. In reading, it is also possible to calculate the total charge in each whole pixel area thereby acquiring a pixel signal similar to a pixel signal obtained by a normal pixel that is not divided. Note that number of areas in which one pixel is divided is not limited to 2, but one pixel may be divided into 3 or more areas. Furthermore, the dividing may be performed in a plurality of directions. In FIG. 3, for simplicity of illustration, 4×4 pixels are included in the image sensing device. However, in practice, the image sensing device may include, for example, 4096 (horizontal)×2160 (vertical) pixels or 8192 (horizontal)×4320 (vertical) pixels. Note that in the present embodiment, the image signal acquired from each area of the image sensing device 102 corresponds to a phase difference signal from which it is possible to detect a phase difference. Note that the phase difference is also used in detecting the focus of the focus lens included in the lens 101 and adjusting the focus.

FIG. 4 is a diagram illustrating a circuit configuration of one pixel in the image sensing device 102.

400 and 401 respectively denote a photodiode (PD) functioning as a photoelectric conversion element which generates, by means of photoelectric conversion, a charge in proportion to incident light. As illustrated in FIG. 3, in the present embodiment, the image sensing device 102 includes two PDs in each pixel. Note that 400 denotes a PD located on a left-hand side (an area a in FIG. 3) of the pixel and 401 denotes a PD located on a right-hand side (an area b in FIG. 3) of the pixel. Each PD is produced by doping impurities into a silicon substrate. However, each PD may be produced by other methods. For example, each PD may be produced using an organic film functioning as a photoelectric conversion film. In this case, a charge holding element for holding a charge is provided in addition to the photoelectric conversion film.

402 and 403 denote transfer switches (TX1 and TX2). The transfer switch 402 (TX1) is controlled when a charge generated in the PD 400 is transferred, and the transfer switch 403 (TX2) is controlled when a charge generated in the PD 401 is transferred.

404 denotes a floating diffusion element (FD) that temporarily holds a charge which is generated in each PD and then transferred therefrom via TX1 or TX2. The FD has particular capacitance which makes it possible to hold the charge, and thus it is possible to generate a voltage signal based on the charge held in the capacitance.

405 denotes a reset switch (RES) of the FD 404. By controlling the RES 405, it is possible to reset charges stored in the PDs and the FD 404.

406 denotes a source follower amplifier (SF) which amplifies the voltage signal generated based on the charge held in the FD 404 and transfers the resultant voltage signal to a following circuit.

407 denotes a row selection switch (SEL) which controls whether the output signal from SF 406 is to be output to a vertical line 408 described below.

Note that switches (TX1, TX2, RES, and SEL) included in each pixel are controlled by a vertical scanning circuit (not shown) included in the image sensing device 102. The vertical scanning circuit outputs an image signal of one frame by controlling pixels in the image sensing device 102 on a row-by-row basis.

Note that elements included in each pixel are formed on a semiconductor substrate. If a crystal defect occurs in semiconductor or the semiconductor is contaminated with an impurity, a pixel defect may occur. In a case where a pixel defect occurs, depending on a characteristic of a location where the defect occurs, a signal output from the defective pixel may be different from a signal that would be output based on a charge proportional to incident light.

408 denotes a vertical line which outputs a signal from the SF 406 selected by the SEL 407 to a column circuit described below. In the present embodiment, the column circuit includes a column amplifier 409 configured to amplify an analog signal output from a pixel and an AD conversion circuit 410 configured to perform an AD conversion on the signal amplified by the column amplifier 409. One column circuit is provided for each vertical line 408, and the column circuit is shared by pixels in the same column.

Note that the AD conversion circuit 410 operates according to control (SH) timing provided by a control circuit (not shown) included in the image sensing device 102 such that after an output signal from the column amplifier 409 is sampled-and-held, this sampled-and-held signal is subjected to the AD conversion. Furthermore, the pixel signal (S signal) based on incident light and the pixel signal (N signal) that occurs in a reset state are subjected to the AD conversion at different times. The respective resultant signals are temporarily stored in different memories, and the N signal is subtracted from the S signal thereby obtaining a pixel signal in which a signal component caused by a variation of the pixel circuit is removed. Note that not only one column circuit but two or more column circuits may be provided for each vertical line 408, or conversely one column circuit may be provided for each two or more vertical lines 408.

Figure 5:
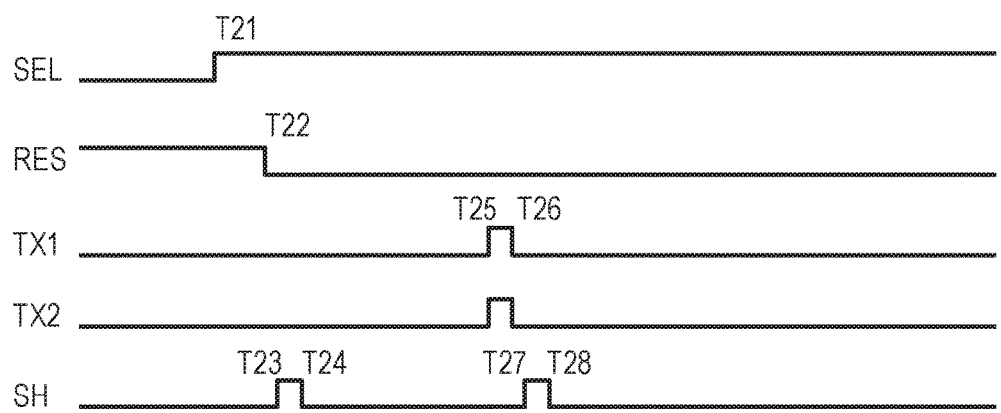
FIG. 5 is a diagram illustrating timing of controlling an image sensing device according to a first control method.

FIG. 5 is a diagram illustrating timing of controlling the image sensing device 102 according to a first control method. That is, FIG. 5 illustrates the timing of reading a signal in a particular row. Each control signal shown in FIG. 5 is output from the vertical scanning circuit such that the signal level thereof is toggled at each timing point (time). Note that control signals are denoted by the same names of the corresponding switches or circuits.

At time T21, the SEL signal is changed from LOW to HIGH. As a result, the SEL 407 is controlled to turn on and thus a signal from the SF 406 is output to the vertical line 408. At this timing point, the RES signal is at the HIGH level, and thus the RES 405 is in the ON-state. As a result, a signal based on the reset voltage is output.

At time T22, the RES signal is changed from the HIGH level to the LOW level. As a result, the RES 405 turns off, and a signal based on a voltage which appears when the FD 404 is in the reset state is output to the vertical line 408 via the SF 406.

At time T23, the SH signal is changed from the LOW level to the HIGH level, and at time T24, the SH signal is changed from the HIGH level to the LOW level. During a period in which the SH signal is temporarily brought to the HIGH level, the signal output to the vertical line 408 is sampled-and-held by a sample-and-hold capacitor in the AD conversion circuit 410. The signal sampled-and-held signal corresponds to the N signal. The sampled-and-held N signal is then subjected to the AD conversion in the AD conversion circuit 410, and a result is stored in a memory.

At time T25, the TX1 signal and the TX2 signal are changed from the LOW level to the HIGH level, and at time T26, the TX1 signal and the TX2 signal are changed from the HIGH level to the LOW level. As a result, charges generated in the PD 400 and the PD 401 are transferred to the FD 404. Although a detailed description is not given in the present embodiment, it becomes possible to accumulate a charge for a particular period (an exposure period) by resetting charges in the PD 400 and the PD 401 at a particular time before the operation shown in FIG. 5 is performed.

At time T27, the SH signal is changed from the LOW level to the HIGH level, and at time T28, the SH signal is changed from the HIGH level to the LOW level. Thus, in a similar manner as at time T23 and time T24, a signal (corresponding to the S signal, in this case) is sampled-and-held and converted to a digital signal by the AD conversion circuit 410.

In the operation shown in FIG. 5, as for the N signal, a noise component occurring in circuits following the FD 404 is AD-converted, while the S signal obtained as a result of this operation includes the sum of the signal components of the PD 400 and the PD 401 and the noise component occurring in the circuits following the FD 404. Therefore, in normal pixels (not-defective pixels), by subtracting the N signal from the S signal, it is possible to obtain a signal based only on signal components of the PD 400 and the PD 401.

However, strictly speaking, there is a slight difference between the timing of acquiring the S signal and the timing of acquiring the N signal, and thus there is a possibility that this slight difference in timing may cause an unintended signal component to be included in the subtraction result. This may occur, for example, in a case where the FD 404 has a defect, and a charge leaks to the FD 404 with time. The leakage of the charge depends on the time elapsed since the end of resetting of the FD 404 (at time T22) or depends on an acquisition time difference between the N signal and the S signal (from time T24 to time T28). Therefore, even if the subtraction described above is performed, there is a possibility that the leakage of the charge to the FD 404 may cause a noise component to remain after the subtraction.

Figure 6:
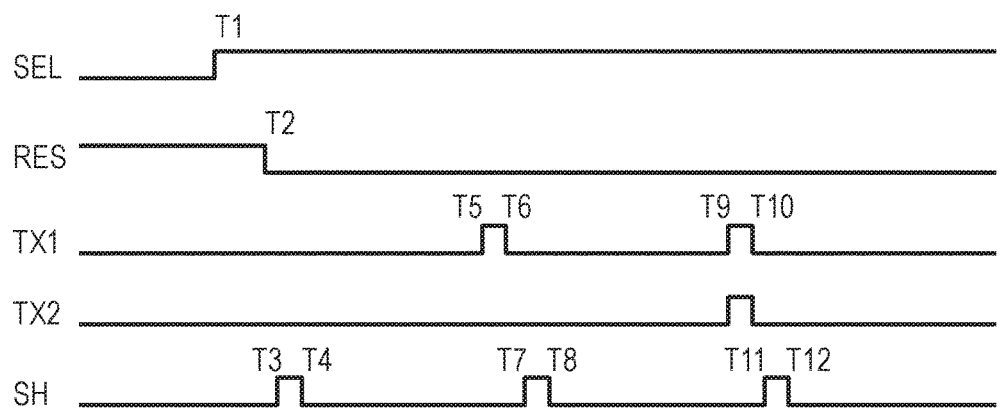
FIG. 6 is a diagram illustrating timing of controlling an image sensing device according to a second control method.

FIG. 6 is a diagram illustrating timing of controlling the image sensing device 102 according to a second control method. The timing is controlled in a similar manner to the control method shown in FIG. 5 until the N signal is acquired (at time T4). Thus, the operation different from the operation by the first control method shown in FIG. 5, that is, the operation of acquiring the S signal and the following operation is described in detail below.

At time T5, the TX1 signal is changed from the LOW level to the HIGH level, and at time T6, the SH signal is changed from the HIGH level to the LOW level. As a result, only the charge generated in the PD 400 is transferred to the FD 404.

At time T7, the SH signal is changed from the LOW level to the HIGH level, and at time T8, the SH signal is changed from the HIGH level to the LOW level. As a result, the S signal based on the charge generated in the PD 400 (hereinafter referred to as the Sa signal) is sampled-and-held and converted to a digital signal by the AD conversion circuit 410.

At time T9, the TX1 signal and the TX2 signal are changed from the LOW level to the HIGH level, and at time T10, the TX1 signal and the TX2 signal are changed from the HIGH level to the LOW level. As a result, the charges generated in the PD 400 and the PD 401 are transferred to the FD 404.

At time T11, the SH signal is changed from the LOW level to the HIGH level, and at time T12, the SH signal is changed from the HIGH level to the LOW level. As a result, the S signal based on the charges generated in the PD 400 and the PD 401 (hereinafter referred to as the Sab signal) is sampled-and-held and converted to a digital signal by the AD conversion circuit 410.

In the operation shown in FIG. 6, as in the operation according to the first control method, as for the N signal, a noise component occurring in circuits following the FD 404 is AD-converted, while the Sab signal obtained as a result of the operation includes the sum of the signal components of the PD 400 and the PD 401 and the noise component occurring in the circuits following the FD 404. Therefore, in normal pixels (not-defective pixels), by subtracting the N signal from the Sab signal, it is possible to obtain a signal based only on signal components of the PD 400 and the PD 401.

However, in a case where the FD 404 has a defect, and a charge leaks to the FD 404 with time, even if the subtraction described above is performed, there is a possibility that the leakage of the charge to the FD 404 may cause a noise component to remain after the subtraction, which may cause the pixel to be detected as a defective pixel in reading. The amount of leakage of the charge is proportional to the accumulation time and thus proportional to the length of the period of time from time T4 to time T12. As may be seen from FIG. 5 and FIG. 6, the acquisition time difference between the N signal and the S signal according to the first control method is smaller than the acquisition time difference between the N signal and the Sab signal according to the second control method. Therefore, in the second control method, an influence of the leakage of the charge is greater than in the first control method. Although in the above description, it is assumed by way of example that the influence of the leakage of the charge depends on the acquisition time difference, it is apparent that leakage of a charge also occurs due to thermal excitation, and the influence of the thermal excitation changes depending on the temperature of the image sensing device 102 or other factors.

Figures 7, 8:
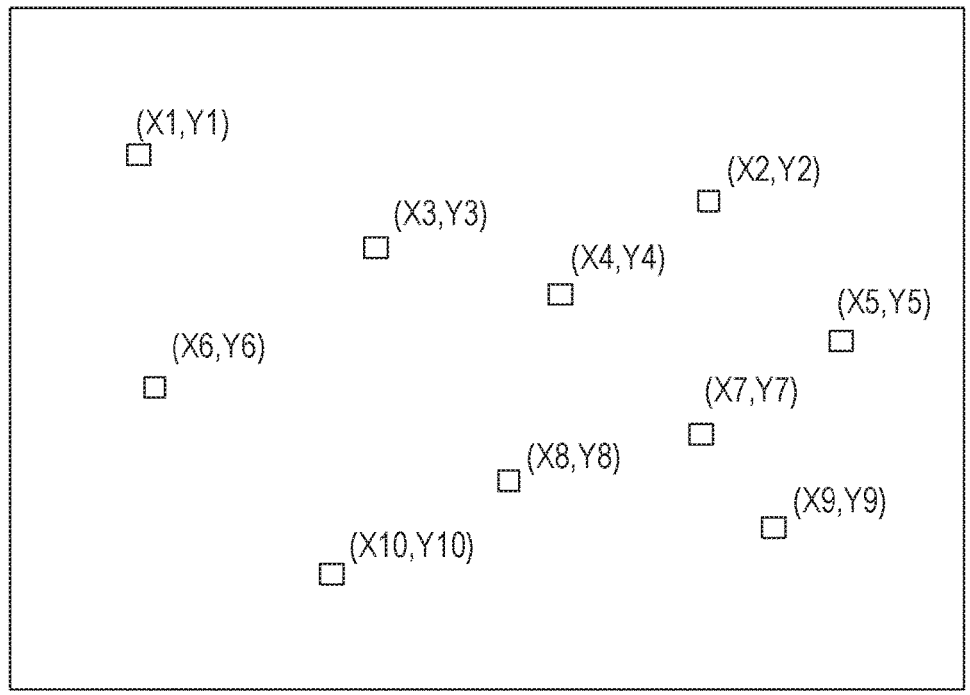
FIG. 7 is a diagram illustrating a format of threshold value data calculated by a threshold value calculation unit in a defective pixel correction unit.
FIG. 8 is a diagram illustrating a control method in a first drive mode according to a first embodiment.

FIG. 7 is a diagram illustrating a format of threshold value data calculated by the threshold value calculation unit 203 in the defective pixel correction unit 110. The threshold value data shown here includes two elements: a defective pixel type; and a threshold value. For example, a threshold value TH1 is defined for a PD-related defective pixel K1, while a threshold value TH2 is defined for an FD-related defective pixel K2. In the defective pixel correction unit 110, when the modified defect data indicates that the type is K1, the correction is performed only when the level information described in the modified defect data is higher than TH1. On the other hand, in the defective pixel correction unit 110, when the modified defect data indicates that the type is K2, the correction is performed only when the level information described in the modified defect data is higher than TH2. The values of the threshold value TH1 and the threshold value TH2 may be changed depending on the camera setting. For example, the proper threshold value is determined depending on the shutter speed (the exposure time), the gain, or the temperature, and the determined threshold value is used in the correction.

First Embodiment

In a first embodiment described below, an example is given in which the modified defect data and the threshold value are changed depending on the drive mode of the image sensing device.

FIG. 8 is a diagram illustrating a control method in a first drive mode according to a first embodiment. In the first drive mode, addition and decimation operations are not performed but pixel reading is performed according to the first control method shown in FIG. 5 for all rows. Therefore, in reading, the first control method is applied when the pixel of interest is at an address from (X1, Y1) to (X10, Y10).

Figure 9:
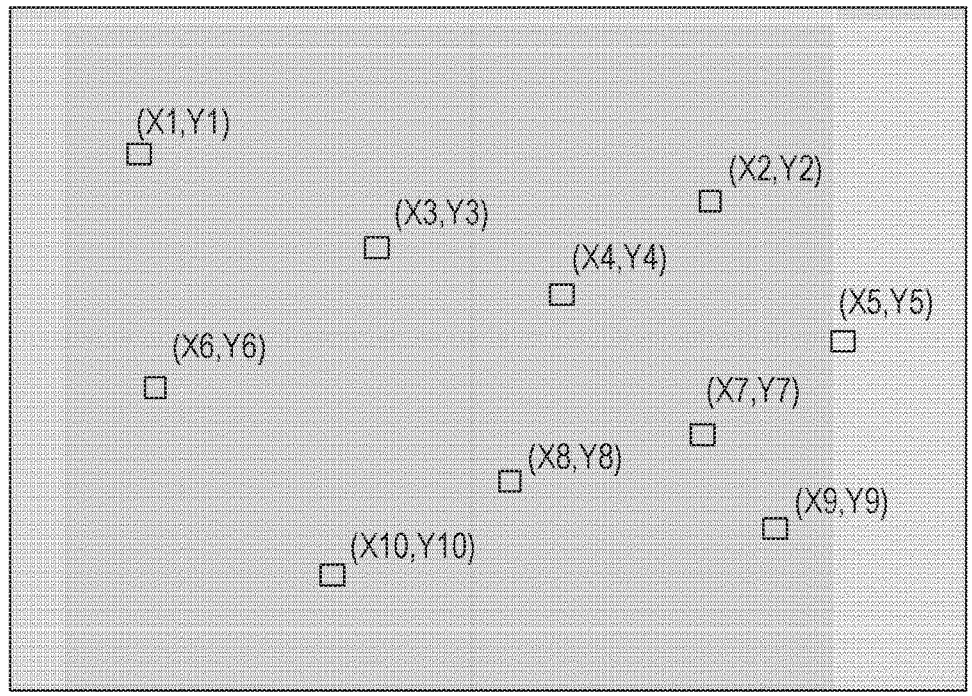
FIG. 9 is a diagram illustrating a control method in a second drive mode according to the first embodiment.

FIG. 9 is a diagram illustrating a control method in a second drive mode according to the first embodiment. In the second drive mode, addition and decimation operations are not performed but pixel reading is performed according to the second control method shown in FIG. 6 for all rows included in each whole frame. Therefore, in reading, the second control method is applied when the pixel of interest is at an address from (X1, Y1) to (X10, Y10).

Figure 10:
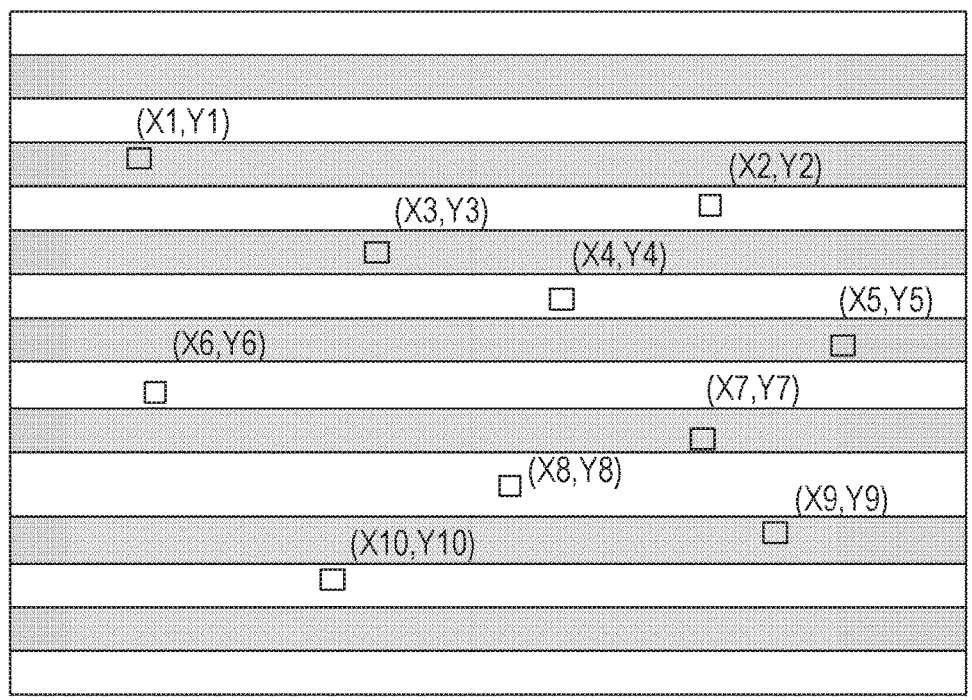
FIG. 10 is a diagram illustrating a control method in a third drive mode according to the first embodiment.

FIG. 10 is a diagram illustrating a control method in a third drive mode according to the first embodiment. In reading in the third drive mode, the control method is changed every several rows alternately between the first control method and the second control method. Therefore, in reading, the second control method is applied when the pixel of interest is at any one of addresses of (X1, Y1), (X3, Y3), (X5, Y5), (X7, Y7), and (X9, Y9). On the other hand, in reading, the first control method is applied when the pixel of interest is at any one of addresses of (X2, Y2), (X4, Y4), (X6, Y6), (X8, Y8), and (X10, Y10).

Figure 11:
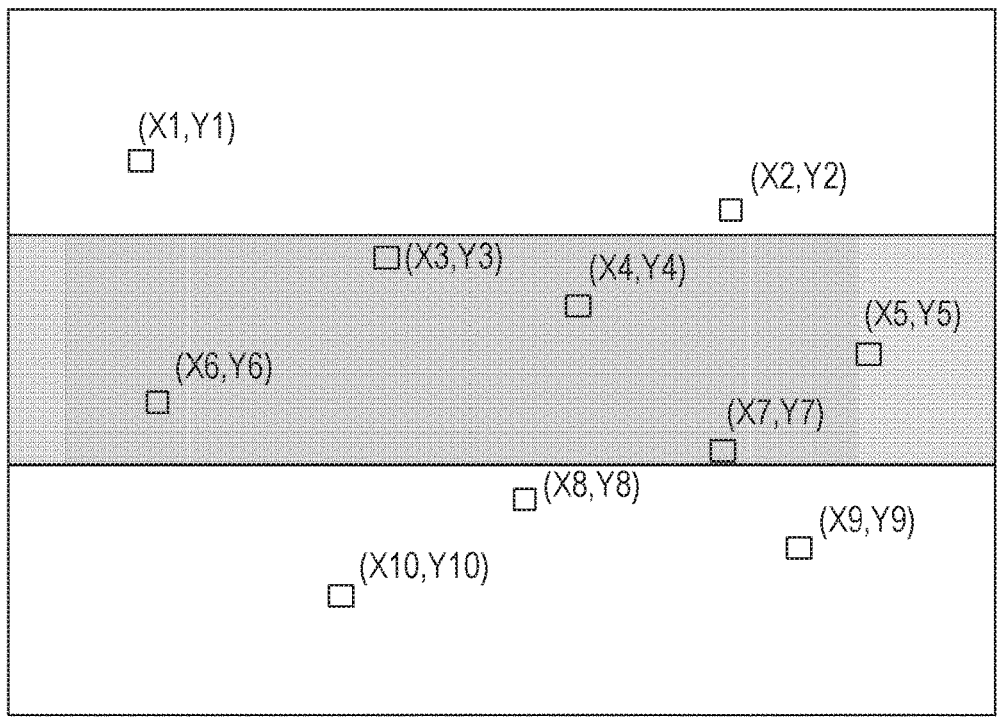
FIG. 11 is a diagram illustrating a control method in a fourth drive mode according to the first embodiment.

FIG. 11 is a diagram illustrating a control method in a fourth drive mode according to the first embodiment. In the fourth drive mode, reading is performed according to the second control method for pixels in a central area (for example, in several rows), and reading is performed according to the first control method for pixels in rows located above and below the central area. Thus, reading is performed according to the first control method when the pixel of interest is at one of addresses of (X1, Y1), (X2, Y2), (X8, Y8), (X9, Y9), and (X10, Y10). On the other hand, reading is performed according to the second control method when the pixel of interest is at one of addresses of (X3, Y3), (X4, Y4), (X5, Y5), and (X7, Y7).

In the second drive mode, the amount of signal read from each pixel is greater than in the first drive mode, and thus a reduction in frame rate occurs compared with that in the first drive mode. However, the second drive mode makes it possible to detect a phase difference for all pixels. In the third drive mode and the fourth drive mode, the amount of signal read from each pixel is smaller than in the second drive mode, and thus it is possible to increase the frame rate compared with that in the second drive mode. Note that in the third drive mode and the fourth drive mode, addition or decimation may be performed in a vertical or horizontal direction as required thereby achieving a further increase in frame rate.

Figure 12:
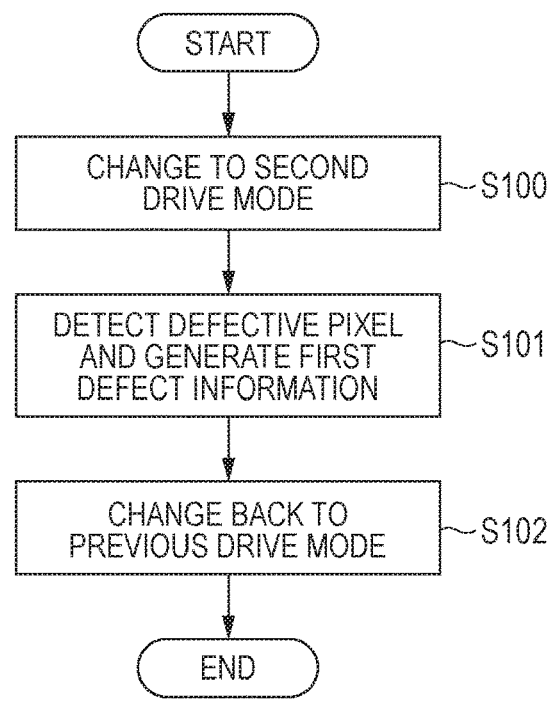
FIG. 12 is a flow chart illustrating a defective pixel detection process according to the first embodiment.

FIG. 12 is a flow chart illustrating a defective pixel detection process according to the first embodiment. This process is performed by the general control/calculation unit 104 while controlling the defective pixel detection unit 109 or the like.

In step S100, the general control/calculation unit 104 changes setting parameters such that the image sensing device 102 is controlled in the second drive mode. Thereafter, the general control/calculation unit 104 advances the process to step S101. Note that the present control may be performed in response to an operation command inputted by a user via an operation unit or the like (not shown) or in accordance with a command given from the outside via the external I/F unit 108.

In step S101, under the control of the general control/calculation unit 104, the pixel signal output from the image sensing device 102 operating in the second drive mode is input to the defective pixel detection unit 109, which detects a defective pixel based on a predetermined threshold value and generates first defect information. Thereafter, the general control/calculation unit 104 advances the process to step S102. Note that a common method of detecting defective pixels is to capture an image of an object with a uniform surface at a white or black level, and detect an output difference between a pixel of interest and surrounding pixels.

In step S103, the general control/calculation unit 104 changes setting parameters such that the drive mode of the image sensing device 102 is changed back to a drive mode employed immediately before step S100 in which the drive mode is controlled to the second drive mode. Thereafter, the general control/calculation unit 104 ends the process.

Note that in the detection in step S101, to make it easy to detect a PD-related or FD-related defective pixel in acquiring an image signal, detection conditions such as the exposure time, the gain, the temperature, the method of controlling the image sensing device, or the like may be changed. For example, to make it easy to detect a PD-related defective pixel, the exposure time may be increased. To easily detect an FD-related defective pixel, the transfer switch 402 and the transfer switch 403 may be switched into the OFF-state thereby achieving a state in which it becomes easy to detect the defective pixel. When a defective pixel is detected under a specific detection condition as described above, a specific defect type is assigned to the defective pixel. In the present embodiment, when a defective pixel is detected under a detection condition in which the exposure time is set to be longer than usual, the defective pixel is determined as a PD-related defective pixel, and K1 is assigned as a defect type to the defective pixel. On the other hand, when a defective pixel is detected under a detection condition in which the transfer switch 403 is brought in the OFF-state, the defective pixel is determined as an FD-related defective pixel, and K2 is assigned as a defect type to the defective pixel.

Figures 13, 14:
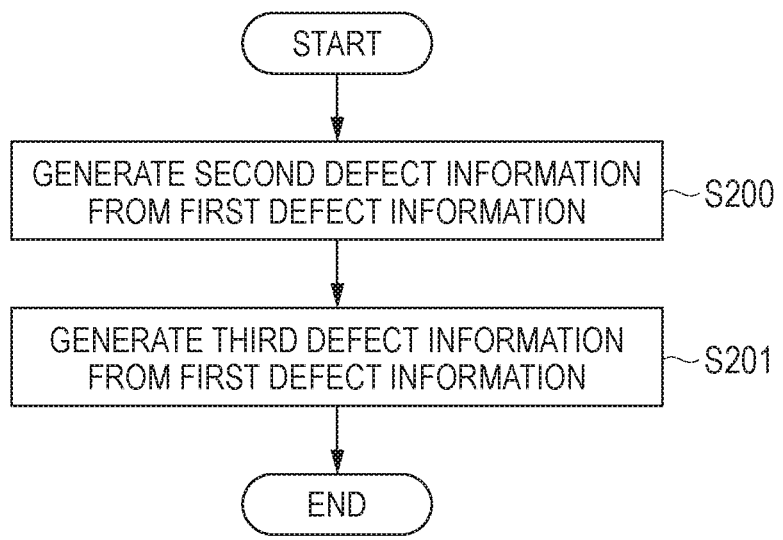
FIG. 13 is a diagram illustrating an example of first defect information.
FIG. 14 is a diagram illustrating a flow chart of a process of generating second defect information and third defect information.

FIG. 13 is a diagram illustrating an example of first defect information. The first defect information includes following three elements: an address; a level; and a type. The address is coordinate information of a defective pixel in an image. The address may be represented using a two-dimensional address including a horizontal address and a vertical address, or using a one-dimensional address indicating a relative value given by the number of pixels counted starting from the top left of the image. The level corresponds to the defect level, and is information representing a level difference of a pixel of interest from a median value or a mean value of surrounding pixels. In the first defect information, the level detected when reading is performed in the second drive mode is stored. The type indicates the type of a defective pixel, that is, the type is information representing a characteristic of a defect. For example, when the level of a defective pixel is higher than levels of surrounding pixels, the defective pixel is determined as having a white defect, while the level is lower than levels of surrounding pixels, the defect is determined as a black defect. The obtained first defect information is stored, in a predetermined format, in the RAM 105 or the ROM 106.

FIG. 14 is a diagram illustrating a flow chart of a process of generating second defect information and third defect information. The process described in this flow chart is also executed by the general control/calculation unit 104.

In step S200, the general control/calculation unit 104 generates second defect information from first defect information. Thereafter, the general control/calculation unit 104 advances the process to step S210. FIG. 15 is a diagram illustrating an example of second defect information. The second defect information includes, as with the first defect information, an address, a level, and a type. The number of pieces of data is the same as that in the first defect information. In the address and the type of the second defect information, the same values as those of the address and the type of the first defect information are stored. As for the level of the second defect information, when the type is K1 indicating the PD-related defect, the same value as that in the first defect information is stored. On the other hand, in a case where the type is K2 indicating that the pixel is an FD-related defective pixel and the pixel address corresponds to a line for which the first control method is used in the third drive mode, the level described in the first defect information is multiplied by a factor α and a result is stored in the level of the second defect information. The factor α indicates the ratio of the defective pixel level in the FD 404 according to the second control method to the defective pixel level in the FD 404 according to the first control method. For example, the ratio is given by (time T28−time T24)/(time T12−time T4). This occurs for pixels at addresses (X1, Y1), (X3, Y3), (X5, Y5), (X7, Y7), and (X9, Y9) in FIG. 10. In a case where the type is K2 indicating that the pixel is an FD-related defective pixel and the pixel address corresponds to a line for which the second control method is used in the third drive mode, the same value as the level described in the first defect information is stored as the level of the second defect information. This occurs for pixels at addresses (X2, Y2), (X4, Y4), (X6, Y6), (X8, Y8), and (X10, Y10) in FIG. 10.

In step S201, the general control/calculation unit 104 generates third defect information from the first defect information. Thereafter, the general control/calculation unit 104 ends the process. FIG. 16 illustrates an example of third defect information. The third defect information includes, as with the first defect information, an address, a level, and a type. The number of pieces of data is the same as that in the first defect information. In the address and the type of the third defect information, the same values as those of the address and the type of the first defect information are stored. As for the level of the third defect information, when the type is K1 indicating that the defect is a PD-related defect, the same value as that in the first defect information is stored. On the other hand, as for the level of the third defect information, in a case where the type is K2 indicating that the defect is an FD-related defect and the pixel address corresponds to a line for which the first control method is used in the fourth drive mode, the level described in the first defect information is multiplied by a factor α and a result is stored in the level of the third defect information. Note that the factor α used here may be the same as or different from that used when the second defect information is generated. In the example shown in FIG. 11, the last case described above occurs at pixels at addresses (X1, Y1), (X2, Y2), (X8, Y8), (X9, Y9), and (X10, Y10). In a case where the type is K2 indicating that the defect is an FD-related defect and the pixel address corresponds to a line for which the second control method is used in the fourth drive mode, the same value as the level described in the first defect information is stored as the level of the third defect information. This case occurs for pixels at addresses (X3, Y3), (X4, Y4), (X5, Y5), (X6, Y6), and (X7, Y7) in FIG. 11.

The second defect information and the third defect information may be generated each time the image capturing apparatus is activated or may be performed only once during the adjustment step in production of the image capturing apparatus. In a case where the second defect information and the third defect information are generated in the adjustment in the production, the data generated in the RAM 105 may be stored in the ROM 106 thereby making it possible for the defective pixel correction unit 110 to use the generated defect information simply by loading the data from the ROM 106 into the RAM 105.

Figure 17:
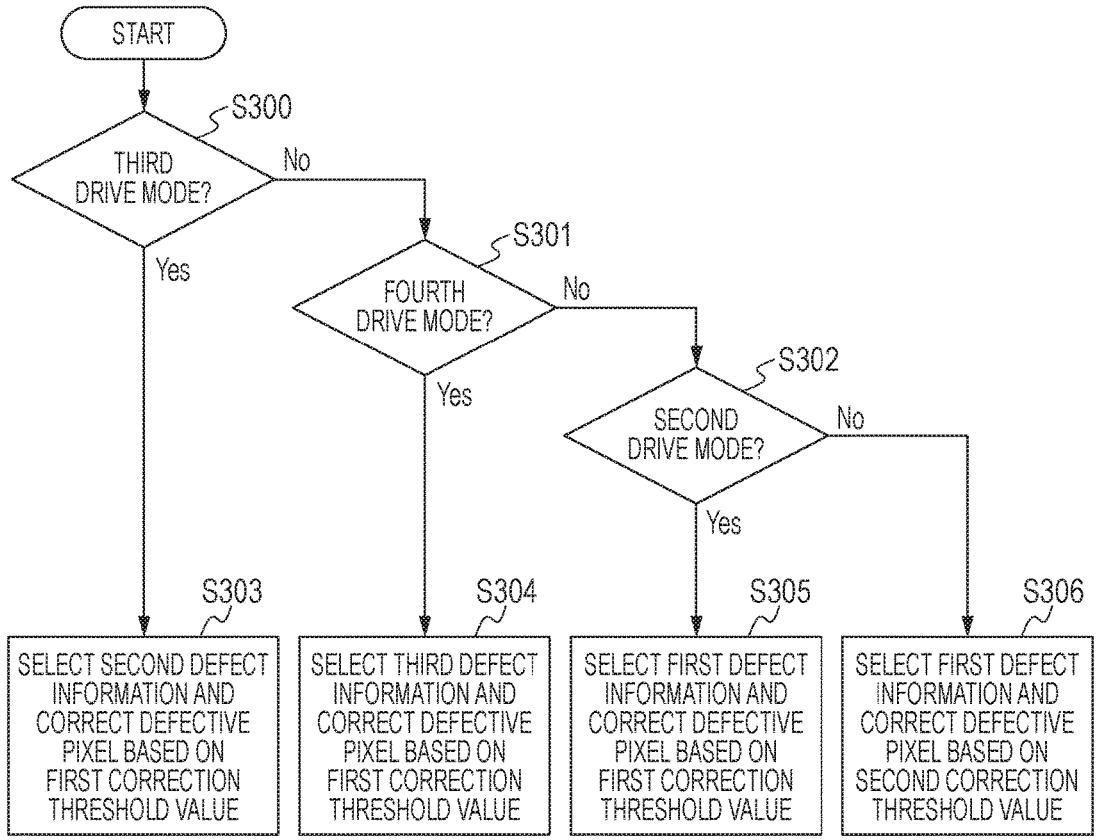
FIG. 17 is a flow chart illustrating a defective pixel correction process for each frame according to the first embodiment.

FIG. 17 is a flow chart illustrating a defective pixel correction process for one frame according to the first embodiment. This process is performed by the general control/calculation unit 104 while controlling the defective pixel correction unit 110 or the like.

In step S300, the general control/calculation unit 104 determines whether the third drive mode is set as the current drive mode. In a case where it is determined that the current drive mode is the third drive mode, the general control/calculation unit 104 advances the process to step S303, but otherwise the general control/calculation unit 104 advances the process to step S301.

In step S303, the general control/calculation unit 104 performs a correction using modified defect data based on the second defect information. More specifically, the general control/calculation unit 104 performs a defective pixel correction using modified defect data based on the second defect information and a first modified threshold value. Thereafter, the general control/calculation unit 104 ends the process.

In step S301, the general control/calculation unit 104 determines whether the fourth drive mode is set as the current drive mode. In a case where it is determined that the current drive mode is the fourth drive mode, the general control/calculation unit 104 advances the process to step S304, but otherwise the general control/calculation unit 104 advances the process to step S302.

In step S304, the general control/calculation unit 104 performs a correction using modified defect data based on the third defect information. More specifically, the general control/calculation unit 104 performs a defective pixel correction using modified defect data based on the third defect information and the first modified threshold value. Thereafter, the general control/calculation unit 104 ends the process.

In step S302, the general control/calculation unit 104 determines whether the second drive mode is set as the current drive mode. In a case where it is determined that the current drive mode is the second drive mode, the general control/calculation unit 104 advances the process to step S305, but otherwise the general control/calculation unit 104 advances the process to step S306.

In step S305, the general control/calculation unit 104 performs a correction using modified defect data based on the first defect information. More specifically, the general control/calculation unit 104# performs a defective pixel correction using modified defect data based on the first defect information and the first modified threshold value. Thereafter, the general control/calculation unit 104 ends the process.

In step S306, the general control/calculation unit 104 performs a correction using modified defect data based on the first defect information. More specifically, the general control/calculation unit 104 performs a defective pixel correction using modified defect data based on the first defect information and a second modified threshold value. Note that the second modified threshold value is given by a value equal to the first modified threshold value multiplied by the reciprocal of the factor α.

As described above, in the first embodiment, the defect information and the modified threshold value used in the correction are switched depending on the drive mode of the image sensing device. This makes is possible to properly perform the defective pixel correction even in a case where the pixel reading method is changed line by line. More specifically, in the first embodiment, data of information (the address, the level, the type, etc.) and the data size (the number of defective pixels or the like) in each piece of modified defect data is described in the same format for all pieces of modified defect data. Therefore, if the data array on the RAM 105 is fixed, when the drive mode is changed, it is possible to switch the defect information and the modified threshold value by simply changing the start address of the defect information or the modified threshold value. Thus, it is possible to perform the process in a short period. Therefore, even in a case where the area in which the phase difference is acquired is changed on a frame-by-frame basis, it is possible to output a high-resolution image without having a reduction in the frame rate. By switching not only the defect information but also the threshold value used in judgement, it becomes possible to reduce the total number of pieces of defect information to be smaller than the number of drive modes of the image sensing device, which suppresses the increase in the data size.

Second Embodiment

In a second embodiment described below, an example is given in which three pieces of defect information are used to adapt to a plurality of drive modes. In the second embodiment, the defective pixel detection process is similar to that according to the first embodiment, and thus a further description thereof is omitted.

Figure 18:
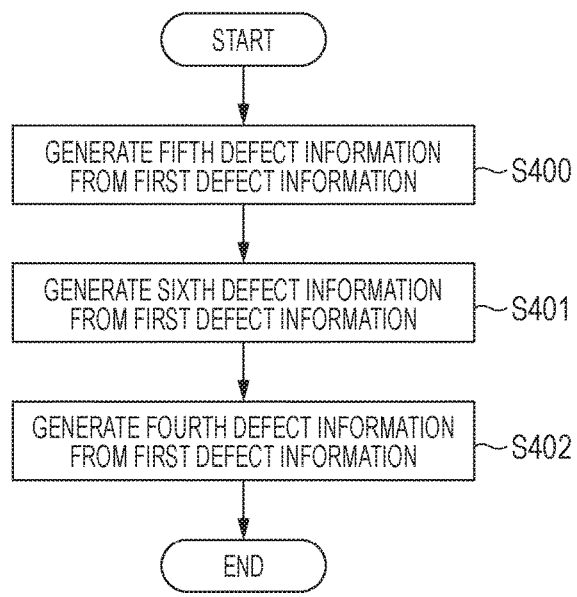
FIG. 18 is a diagram illustrating a flow chart of a process of generating defect information according to a second embodiment.

FIG. 18 is a diagram illustrating a flow chart of a process of generating defect information according to the second embodiment. This process is performed by the general control/calculation unit 104.

In step S400, the general control/calculation unit 104 generates fifth defect information from the first defect information. Thereafter, the general control/calculation unit 104 advances the process to step S401. FIG. 19 illustrates an example of fifth defect information.

The third defect information includes following three elements: an address; a level; and a type. The number of pieces of data is the same as that in the first defect information. The address and the type in the first defect information are the same as those in the fifth defect information. As for the level of the fifth defect information, when the type described in data is K1, the same level as that described in corresponding data in the first defect information is stored as the level of the data of the fifth defect information. On the other hand, in the fifth defect information, when the type described in data is K2, an initial value Linit (for example, 4095) is stored as the level of the data. The process is performed as described above, and resultant modified defect data in the fifth defect information corresponding to addresses from (X1, Y1, Linit, K2) to (X10, Y10, L10, K1) are stored in the RAM 105 at addresses from D1_1 to D1_10.

In step S401, the general control/calculation unit 104 generates sixth defect information from the first defect information. Thereafter, the general control/calculation unit 104 advances the process to step S402. FIG. 20 illustrates an example of sixth defect information. The content of the sixth defect information is the same as that of the fifth defect information for all pieces of data although addresses thereof on the RAM 105 are different. The sixth defect information is generated in a similar manner as described above. Respective pieces of modified defect data from (X1, Y1, Linit, K2) to (X10, Y10, L10, K1) in the sixth defect information are stored in the RAM 105 at addresses from D2_1 to D2_10.

Figures 21, 22:
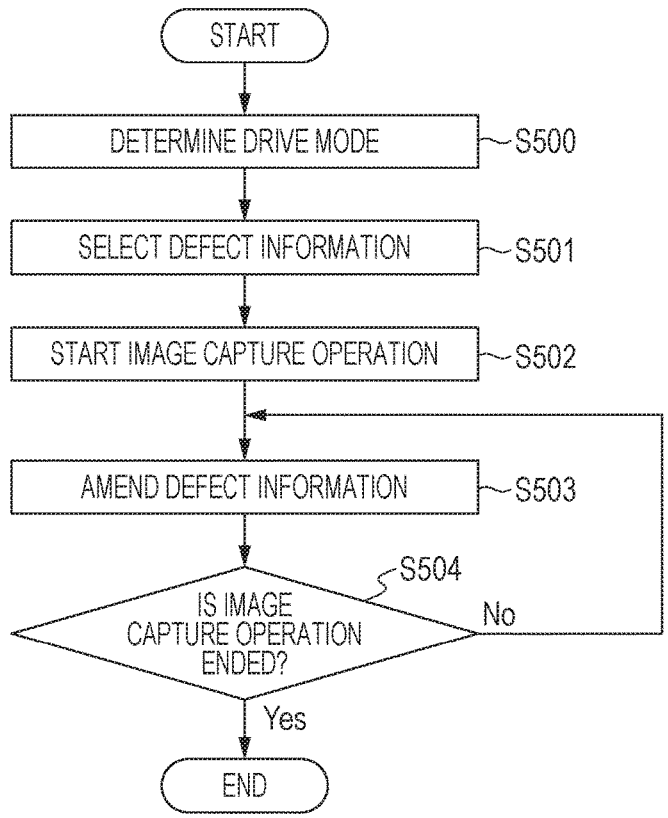
FIG. 21 is a diagram illustrating an example of fourth defect information.
FIG. 22 is a flow chart illustrating a defective pixel correction process for each frame according to the second embodiment.

In step S402, the general control/calculation unit 104 generates fourth defect information from the first defect information. Thereafter, the general control/calculation unit 104 ends the process. FIG. 21 illustrates an example of fourth defect information. The fourth defect information includes following five elements: a vertical address; a first level; a second level; a first RAM address; and a second RAM address. The number of pieces of data included in the fourth defect information is the same as the number of pieces of data which are included in the first defect information and in which K2 is described as the type. The vertical address of the fourth defect information is given such that the address information in the vertical direction (in the Y direction) is extracted from the address information of the data which is included in the first defect information and in which K2 is described as the type, and the extracted vertical address is stored in the corresponding data of the fourth defect information. As for the first level, data which is included in the first defect information and in which K2 is described as the type is extracted, and level information described in each piece of extracted data is stored as the first level in data, corresponding to the address information, in the fourth defect information. As for the second level, in each piece of data in which the first level is stored in the above-described manner, the first level is multiplied by a factor α (for example, ½) and the result is stored as the second level. The first RAM address describes the address on the RAM 105 where the corresponding data including the level of interest described above in the fifth defect information is stored. For example, this case occurs at D1_1, D1_2, etc. The second RAM address describes the address on the RAM 105 where the corresponding data including the level of interest described above in the sixth defect information is stored. For example, this case occurs at D2_1, D2_2, etc.

Note that the process described in the flow chart in FIG. 18 according to the present embodiment may be executed at any proper time. For example, generating of the fourth defect information, the fifth defect information, and the sixth defect information may be performed each time the apparatus is activated or may be performed only once during the adjustment step. In a case where the generation is performed in the adjustment step, the data generated in the RAM 105 may be stored in the ROM 106 thereby making it possible for the defective pixel correction unit 110 to use the generated data simply by loading the data from the ROM 106 into the RAM 105. In response to a command issued by a user, a process may be performed, together with the above-described process, to detect a defect that occurs subsequently.

FIG. 22 is a flow chart illustrating a defective pixel correction process for each frame according to the second embodiment. This process is performed by the general control/calculation unit 104 while controlling the defective pixel correction unit 110 or the like.

In step S500, when a command to start an image capturing process is issued by a user or the like, the general control/calculation unit 104 determines the drive mode in which to drive the image sensing device 102. Thereafter, the general control/calculation unit 104 advances the process to step S501.

The drive mode is selected from available modes similar to those according to the first embodiment. However, in the present embodiment, other drive modes may be employed. For example, in the third drive mode, a row to which the second control method is applied may be changed, or in the fourth drive mode, an area to which the second control method is applied may be changed. Parameters corresponding to the drive mode determined in this step are set in the image sensing device 102 by the general control/calculation unit 104. The image sensing device 102 starts outputting pixel signals at predetermined intervals (30 fps, 60 fps, etc.) based on the set parameters. Note that in this step, storing in the storage medium 107 or displaying on a display apparatus (not shown) is not performed.

In step S501, the general control/calculation unit 104 selects, from the defect information stored in the RAM 105, defect information corresponding to the drive mode determined in step S500. Thereafter, the general control/calculation unit 104 advances the process to step S502.

In step S502, the general control/calculation unit 104 controls each block to start the image capturing operation. Thereafter, the general control/calculation unit 104 advances the process to step S503. In the present embodiment, the image capturing operation refers to an operation of providing pixel signals output from the image sensing device 102 to a user in a proper manner. An example is to store an image based on pixel signals into the storage medium 107. Another example is to display an image on a display apparatus (not illustrated).

In step S503, the general control/calculation unit 104 modifies defect information for a next frame as necessary while continuing the image capturing operation started in step S502. A method of modifying the defect information in this step will be described in detail later with reference to FIG. 23. Thereafter, the general control/calculation unit 104 advances the process to step S504, and repeats the operation in step S503 until the image capturing operation is ended. If the general control/calculation unit 104 detects that a command to end the image capturing operation is issued by a user or the like, the general control/calculation unit 104 ends the process described in the present flow chart.

Figure 23:
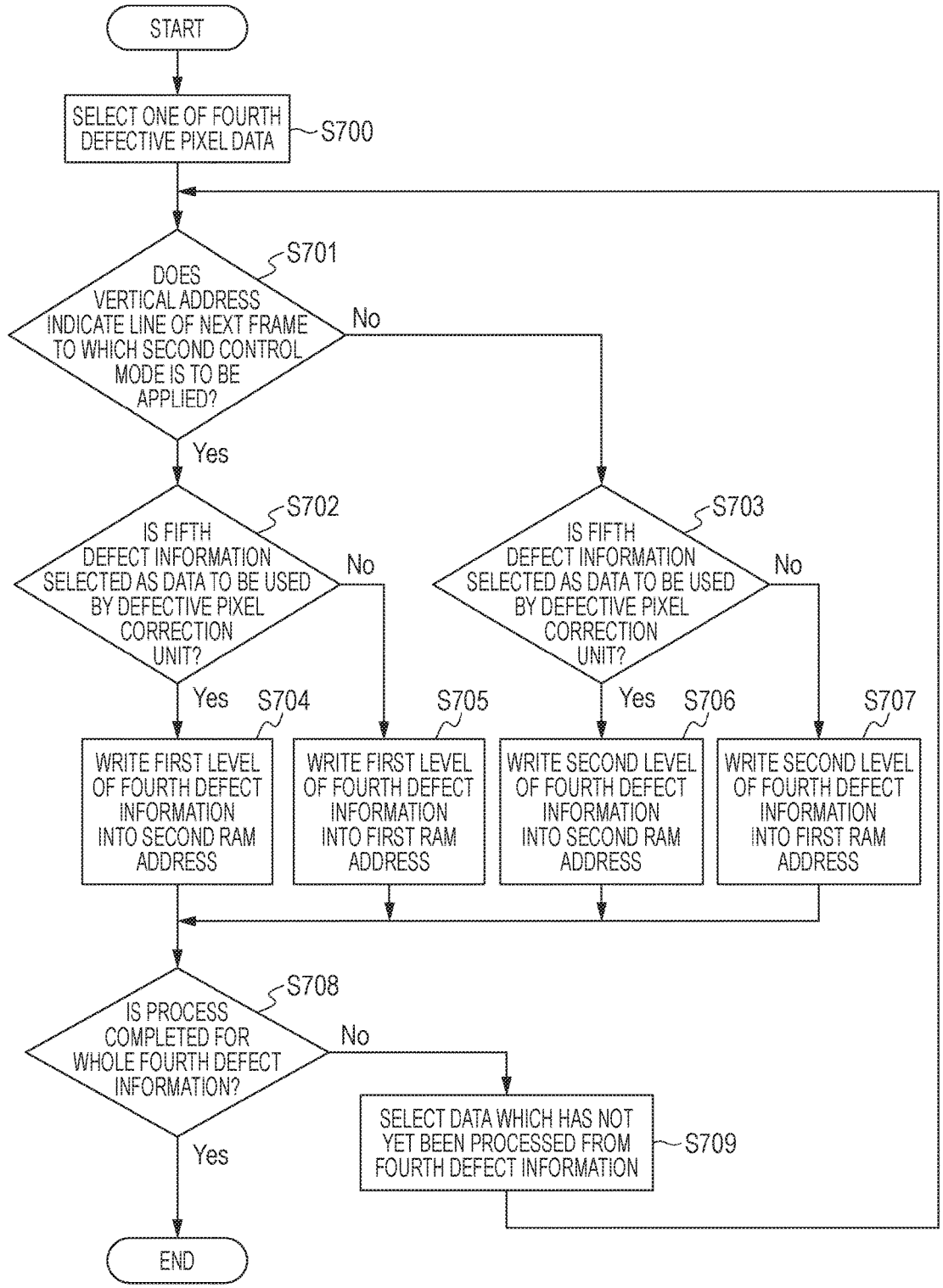
FIG. 23 is a flow chart illustrating details of a defect information modification process in a step in FIG. 22.

FIG. 23 is a flow chart illustrating details of the defect information modification process in step S503 in FIG. 22. This process is performed by the general control/calculation unit 104. Defect information is modified in step S503 mainly in a case where a line to which the second control method is applied is changed. For example, in a case where an object is to be tracked, the phase difference is acquired in response to moving of object, and thus lines are changed, on a frame-by-frame basis, to which the second control method is applied. In this case, changing of lines to which the second control method is applied is performed by the general control/calculation unit 104, and the defect information is modified when lines are changed.

In step S700, the general control/calculation unit 104 selects one piece of data of the fourth defect information (for example, data at the head). Thereafter, the general control/calculation unit 104 advances the process to step S701.

In step S701, the general control/calculation unit 104 determines whether a vertical address stored in the data of the fourth defect information selected in step S700 or the like indicates a line to which the second control method is to be applied in a next frame. In a case where the vertical address indicates the line to which the second control method is to be applied in the next frame, the general control/calculation unit 104 advances the process to step S702, but otherwise the general control/calculation unit 104 advances the process to step S703.

In step S702, the general control/calculation unit 104 determines whether data of the fifth defect information has been selected as data used by the defective pixel correction unit 110. In a case where data of the fifth defect information has been selected as data used by the defective pixel correction unit 110, the general control/calculation unit 104 advances the process to step S704, but otherwise the general control/calculation unit 104 advances the process to step S705.

In step S703, the general control/calculation unit 104 determines whether data of the fifth defect information has been selected as data used by the defective pixel correction unit 110. In a case where data of the fifth defect information has been selected as data used by the defective pixel correction unit 110, the general control/calculation unit 104 advances the process to step S706, but otherwise the general control/calculation unit 104 advances the process to step S707.

In step S704, the general control/calculation unit 104 stores the first level of the fourth defect information into not-selected sixth defect information. More specifically, the level of the defect information is written into a corresponding second RAM address. Thereafter, the general control/calculation unit 104 advances the process to step S708.

In step S705, the general control/calculation unit 104 stores the first level of the fourth defect information into not-selected fifth defect information. More specifically, the general control/calculation unit 104 stores the level of the defect information into a corresponding first RAM address. Thereafter, the general control/calculation unit 104 advances the process to step S708.

In step S706, the general control/calculation unit 104 stores the second level of the fourth defect information into not-selected sixth defect information. More specifically, the general control/calculation unit 104 stores the level of the defect information into a corresponding second RAM address. Thereafter, the general control/calculation unit 104 advances the process to step S708.

In step S707, the general control/calculation unit 104 stores the second level of the fourth defect information into not-selected fifth defect information. More specifically, the general control/calculation unit 104 stores the level of the defect information into a corresponding first RAM address. Thereafter, the general control/calculation unit 104 advances the process to step S708.

In step S708, the general control/calculation unit 104 determines whether the process is completed for the whole fourth defect information. In a case where the process is completed for the whole fourth defect information, the general control/calculation unit 104 ends the process, but otherwise the general control/calculation unit 104 advances the process to step S709.

In step S709, the general control/calculation unit 104 selects data which has not yet been processed from the fourth defect information, and the general control/calculation unit 104 returns the process to step S701.

In the second embodiment, as described above, two pieces of defect information are prepared, and a piece of defect information which is not currently in use is modified as required. This makes it possible to properly perform the defective pixel correction even in a case where a line to which the second control method is applied is changed to an arbitrary line on a frame-by-frame basis. In particular, in the second embodiment, it is possible to change the defect information by simply rewriting a minimum part of data, and thus it is possible to perform the process in a short period of time. The technique disclosed in the second embodiment is useful, in particular, to acquire a moving image in a so-called 8K format in which each frame includes 4000 or more pixels in the vertical direction or a moving image in a full HD format in which the frame rate is equal to greater than 120 fps. Furthermore, regardless of lines to which the first control method and the second control method are respectively applied, it is possible to make a correction for any combination using only the fourth defect information, the fifth defect information, and the sixth defect information, which allows a reduction in the data size.

The disclosure has been described above with reference to exemplary embodiments, the disclosure is not limited to these embodiments. Note that many modifications are possible without departing from the scope of the disclosure. Furthermore, various combinations of embodiments may be possible.

In the embodiments described above, it is assumed by way of example but not limitation that a defect causes a charge to leak to the FD 404 with time. For example, the embodiments may be applied to a case where the change of the reading operation mode in the image sensing device includes changing of a plurality of vertical lines or to a case where there is a difference in pixel reading timing for one pixel.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-249804, filed Dec. 22, 2016, which is hereby incorporated by reference herein in its entirety.

What is claimed is:

1. An apparatus including a sensing device capable of acquiring a phase difference signal for use in focus detection and a pixel signal for an image, the apparatus comprising:
a controller having a processor which executes instructions stored in a memory or having circuitry, the controller being configured to function as:
a control unit configured to switch acquisition of the phase difference signal on an area-by-area basis in a frame in the sensing device, and
a correction unit configured to select defect information associated with the pixel signal acquired from the sensing device and correct the pixel signal based on the selected defect information,
wherein the memory stores the defect information which includes at least first defect information and second defect information in a same format as that of the first defect information,
the control unit has at least a first drive mode and a second drive mode in which the phase difference signal is acquired for an area different from an area for which the phase difference signal is acquired in the first drive mode, and
the correction unit switches defect information used, based on a change of an area in a frame in which the phase difference signal is to be acquired, and uses the first defect information in a case where, in a frame to be acquired, the control unit performs the control in the first drive mode while using the second defect information in a case where the control unit performs the control in the second drive mode.

2. The apparatus according to claim 1, wherein the control unit performs control such that in an area in the frame in which the phase difference signal is acquired, the phase difference signal is acquired before the pixel signal is acquired from the sensing device.

3. The apparatus according to claim 1, wherein
the defect information includes information indicating one of an address, a level, and a type of a defective pixel, and
the first defect information and the second defect information are different at least in terms of the level.

4. The apparatus according to claim 3, further comprising a calculation unit configured to calculate at least part of the first defect information or the second defect information based on third defect information,
wherein the calculation unit performs the calculation based on the type included in the defect information.

5. The apparatus according to claim 4, wherein the third defect information corresponds to defect information obtained when the phase difference signal is acquired from a whole frame.

6. The apparatus according to claim 1, wherein the image is a moving image in which a number of pixels in a vertical direction is equal to or greater than 4000 or a frame rate is equal to or greater than 120 fps.

7. A method of controlling an apparatus, the apparatus including a sensing device and a memory, the sensing device being capable of acquiring a phase difference signal for use in focus detection and a pixel signal for an image, the memory being configured to store a plurality of pieces of information, the method comprising:
switching by a control unit, in the sensing device, acquisition of the phase difference signal in a frame on an area-by-area basis;
performing a correction, including selecting defect information associated with the pixel signal acquired from the sensing device and correcting the pixel signal based on the selected defect information,
wherein the memory stores the defect information which includes at least first defect information and second defect information in a same format as that of the first defect information,
the control unit has at least a first drive mode and a second drive mode in which the phase difference signal is acquired for an area different from an area for which the phase difference signal is acquired in the first drive mode, and in the correcting, defect information used is switched based on a change of an area in a frame in which the phase difference signal is to be acquired, and uses the first defect information in a case where, in a frame to be acquired, the control unit performs the control in the first drive mode while using the second defect information in a case where the control unit performs the control in the second drive mode.

8. The method according to claim 7, wherein the control unit performs control such that in an area in the frame in which the phase difference signal is acquired, the phase difference signal is acquired before the pixel signal is acquired from the sensing device.

9. The method according to claim 7, wherein
the defect information includes information indicating one of an address, a level, and a type of a defective pixel, and
the first defect information and the second defect information are different at least in terms of the level.

10. The method according to claim 9, further comprising calculating at least part of the first defect information or the second defect information based on third defect information,
wherein the calculating performs the calculation based on the type included in the defect information.

11. The method according to claim 10, wherein the third defect information corresponds to defect information obtained when the phase difference signal is acquired from a whole frame.

12. The method according to claim 7, wherein the image is a moving image in which a number of pixels in a vertical direction is equal to or greater than 4000 or a frame rate is equal to or greater than 120 fps.

* * * * *